(12) United States Patent
Labar et al.

(10) Patent No.: US 7,681,385 B2
(45) Date of Patent: Mar. 23, 2010

(54) MOWER LIQUID HERBICIDE APPLICATOR

(75) Inventors: Victor Labar, Regina (CA); Robert Degelman, Regina (CA); Donald Stevenson, Raymore (CA); Keith Boras, Red Deer (CA)

(73) Assignee: Degelman Industries Ltd., Regina Saskatchewan (CA)

( * ) Notice: Subject to any disclaimer, the term of this patent is extended or adjusted under 35 U.S.C. 154(b) by 0 days.

(21) Appl. No.: 12/027,531

(22) Filed: Feb. 7, 2008

(65) Prior Publication Data

US 2009/0199531 A1 Aug. 13, 2009

(51) Int. Cl.
*A01D 19/00* (2006.01)
(52) U.S. Cl. ........................................................ 56/16.8
(58) Field of Classification Search ................... 56/16.8, 56/320.1, 295; 30/123, 131, 123.3, 276; 47/1.5, 1.7; 239/172, 223, 175, 222.11, 214.21, 239/129
See application file for complete search history.

(56) References Cited

U.S. PATENT DOCUMENTS

| 2,740,248 | A | | 4/1956 | Pickens | |
|---|---|---|---|---|---|
| 2,878,633 | A | | 3/1959 | Mullin | |
| 2,900,658 | A | * | 8/1959 | Baird | 15/250.01 |
| 2,908,444 | A | * | 10/1959 | Mullin | 239/223 |
| 2,939,636 | A | * | 6/1960 | Mullin | 239/214.21 |
| 2,973,615 | A | | 3/1961 | Yaremchuk et al. | |
| 3,090,187 | A | | 5/1963 | Livingston | |
| 3,332,221 | A | * | 7/1967 | McCain | 56/295 |
| 3,334,475 | A | | 8/1967 | Danisch | |
| 3,722,820 | A | * | 3/1973 | Klint, Jr. | 239/129 |
| 4,264,999 | A | * | 5/1981 | Monson | 15/321 |
| 4,719,719 | A | * | 1/1988 | Stevens | 47/1.5 |
| 4,870,946 | A | * | 10/1989 | Long et al. | 125/13.01 |
| 4,926,622 | A | | 5/1990 | McKee | |
| 5,148,992 | A | * | 9/1992 | Morrow | 239/289 |
| 5,237,803 | A | | 8/1993 | Domingue, Jr. | |
| 5,329,752 | A | | 7/1994 | Milbourn | |
| 5,456,412 | A | * | 10/1995 | Agee | 239/104 |
| 5,813,122 | A | * | 9/1998 | Mubareka | 30/276 |
| 6,125,621 | A | | 10/2000 | Burch | |
| 6,164,049 | A | * | 12/2000 | Burch | 56/16.8 |
| 6,256,886 | B1 | * | 7/2001 | Legrand | 30/123.3 |
| 6,374,586 | B1 | * | 4/2002 | Burch | 56/16.8 |
| 6,446,420 | B1 | * | 9/2002 | Worsham et al. | 56/27.5 |
| 6,497,088 | B1 | * | 12/2002 | Holley | 56/16.8 |
| 6,860,093 | B2 | * | 3/2005 | Scordilis | 56/15.2 |
| 6,886,256 | B2 | * | 5/2005 | Hobday et al. | 30/123.3 |
| 2004/0045166 | A1 | * | 3/2004 | Hobday et al. | 30/123.3 |

\* cited by examiner

*Primary Examiner*—Árpád Fábián-Kovács
(74) *Attorney, Agent, or Firm*—Daniels Patent Law PLLC; Scott A. Daniels

(57) ABSTRACT

An apparatus and method for supply of treating fluid to a cutting apparatus directly to cut vegetation substantially simultaneously with the cutting of the vegetation. Treating fluid is delivered from the supply to an intermediate, sealed reservoir into which a desired volume of treating fluid is maintained. The treating fluid is then delivered from the sealed reservoir, via centrifugal force, through a channel to a passageway formed in the bolt connecting the cutting blade to a blade mount of the mower. The treating fluid is ejected from the bolt passage directly onto the exposed undersurface of the cutting blade and directly to the vegetation at the same time that it is cut so that the treatment fluid, herbicide or other chemical is absorbed directly into the translocation system of the cut vegetation.

13 Claims, 9 Drawing Sheets

MOWER LIQUID HERBICIDE APPLICATOR

FIELD OF THE INVENTION

The present invention relates to a mowing and vegetation cutting apparatus for applying a treatment fluid directly to cut vegetation via the cutting blades of a modified rotary cutter, and more particularly to an apparatus and method for delivering the herbicide application through an intermediate centrifugal reservoir channeling the liquid herbicide onto the bottom surface of the cutting blades of the rotary cutter where it is dispersed without atomization.

BACKGROUND OF THE INVENTION

Numerous government agencies, along with utility companies, for example, power producing utilities and state and local highway departments, often use large rotary cutters or rotary mowers to control vegetation along the shoulders of roads or along right-of-ways under power transmission lines, etc. These entities generally operate and/or contract out such vegetation control services which use these large rotary mowers for mowing the right-of-ways as well as the highway and roadway medians and shoulders. These entities have found that in addition to mowing it is conducive to vegetation control to apply certain fluid treatments to the vegetation, including growth regulators, herbicides, pesticides, fungicides and fertilizers or biological agents.

Generally known broadcasting and application methods for such fluid treatment often cause an indiscreet broadcast into the air or randomly dispersed application where some plants are treated and others remain untreated for instance where an operator applying the fluid treatment may not evenly treat the desired vegetation. Atomization of the fluid treatment where the fluid is broken into small, molecular level particle size droplets also increases the problem of random dispersal where wind and environmental factors cause uneven application of the atomized treatment fluid. In these cases, the usefulness of such fluid treatment or herbicide treatments is minimal. Farmers and landowners living near where such chemical treatments and applications occur object to these relatively random applications which can result in tremendous run-off and contamination of their properties and crops. Therefore, it is very important that such chemical treatments be absorbed into the vascular and/or translocation systems of the plant so that it produces the most effective result.

There are a number of known rotary brush cutters and herbicide applicators, including U.S. Pat. No. 4,926,622 to McKee. McKee discloses a number of cutting blades and a system for delivering the herbicide adjacent the cutting blades so that the herbicide is applied to the vegetation as it is being cut by the rotating cutting blades. Also U.S. Pat. No. 5,237,803 to Domingue, Jr. shows a centrifugal applicator which uses a lower pan which throws a fluid treatment against an upper shield which then disperses the fluid treatment above the cutting blades onto the cut vegetation, preferably without getting or collecting the treatment fluid on the blades themselves. Openings in the lower pan are radially spaced from the cutting blades so that the ejected fluid treatment or pesticide does not collect on the cutting blades.

More recently, U.S. Pat. No. 6,125,621 to Burch discloses an apparatus and method for cutting and treating vegetation whereby a herbicide is delivered by a pump in a continuous uninterrupted stream from the supply tank to the cutting blades through the drive shaft of the cutting blade transmission, through a connection bolt and connecting blade hub and onto the bottom surface of a cutting blade. The drawback associated with this reference is two-fold, first the cutting blade is composed of numerous expensive parts which require a tremendous amount of precision in manufacture and assembly and thus create a particularly high cost to both the production and use of such an apparatus and herbicide treating system. Secondly, the manufacture of the drive shaft with a passage for the treatment fluid and the requisite size constraints of the transmission casing in which the drive shaft is located cause the shaft to be modified in such a manner as to compromise its shear strength. Drive shaft failure, transmission tolerances and rebuilding have become a major issue based on this modification. Also, the leakage of any herbicide from this shaft inside the cutting blade transmission will burn out the transmission so that complete failure of the transmission is almost inevitable.

OBJECT AND SUMMARY OF THE INVENTION

The apparatus and method of the present invention includes a system for supply of treating fluid to be delivered by a cutting apparatus directly to cut vegetation substantially simultaneously with the cutting of the vegetation. The treating fluid is delivered from the supply to an intermediate, sealed reservoir into which a desired volume of treating fluid is maintained, the treating fluid is then delivered from the sealed reservoir, via centrifugal force, through a channel to a passageway formed in the bolt connecting the cutting blade to a blade mount of the mower. The treating fluid is ejected from the bolt passage directly onto the exposed undersurface of the cutting blade and hence directly to the vegetation at the same time that it is cut so that the treatment fluid, herbicide or other chemical is absorbed directly into the translocation system of the plant so as to provide the maximum efficiency and effectiveness of the treating fluid.

It is an object of the present invention to provide an apparatus and method and, in particular, a mower and cutting device for cutting and simultaneously treating the stems of cut vegetation with the treatment fluid supplied directly to the underside of a cutting blade of a mower.

It is another object of the present invention to provide an apparatus and method for cutting and simultaneously treating the remaining stems of the cut vegetation by introducing a treatment fluid directly to the translocation system of the cut vegetation.

It is still another object of the present invention to provide for a treating fluid supply which supplies an intermediate reservoir rotating with a blade mount on the underside of a mower deck to centrifugally deliver the fluid treatment to the underside of the cutting blades via a channel and passageway.

It is another and more particular object of the present invention to provide a cutting and treatment fluid delivery apparatus which minimizes the parts and manufacturing steps and costs associated with fabricating and maintaining the apparatus.

The invention is an apparatus and method for cutting vegetation and simultaneously treating the remaining stems of the cut vegetation with a treatment fluid such as a growth regulator, herbicide, pesticide, fungicide, fertilizer, adjuvant surfactant or biological agent, which is preferably water born. The treatment is applied without broadcasting, such as by spraying the treatment onto the surrounding ground or into the atmosphere. Instead, the treatment fluid is delivered from a hermetically sealed fluid container through a fluid conduit to the underside of the cutting blade.

The apparatus includes a mower or cutting blade, a drive means for rotating the cutting blade, a fluid supply or container means for supplying the treatment fluid and an intermediate reservoir fluid channel means for delivering the treatment fluid from the intermediate reservoir to the underside of the cutting blade. The mower may be, for example, a push lawnmower, a conventional power lawnmower, a riding lawnmower, an engine driven tractor, a bush hog mower, a bat-wing mower, a harvester, a hydraulic feller buncher, a high-speed sawhead, a high-speed shearhead, a sicklebar, a multiple disk mower, a real mower, a flail mower, or mower head attached to the end of a hinged boom arm.

The present invention relates to an apparatus for cutting vegetation and treating the cut stems with a desired treatment fluid, the apparatus having a blade mount non-rotatably connected to a drive shaft, at least one cutting blade connected to the blade mount by a securing bolt, a fluid reservoir supported on the blade mount, a radial extending channel formed in the blade mount and communicating from the fluid reservoir through the blade mount to an exit orifice immediately adjacent a surface of the cutting blade.

The present invention also relates to a method of delivering a desired treating fluid to a surface of a cutting blade, the method having the steps of securing a blade mount non-rotatably connected to a drive shaft, connecting at least one rotary driven cutting blade connected to the blade mount by a securing bolt, supplying the desired treating fluid to a fluid reservoir supported on the blade mount, inducing the treating fluid to flow from the fluid reservoir by centrifugal force into a channel formed in the blade mount and ejecting the treating fluid from a radially extending exit opening in the securing bolt directly onto a bottom surface of the cutting blade.

BRIEF DESCRIPTION OF THE DRAWINGS

The invention will now be described, by way of example, with reference to the accompanying drawings in which.

DETAILED DESCRIPTION OF THE INVENTION

Figure 1:
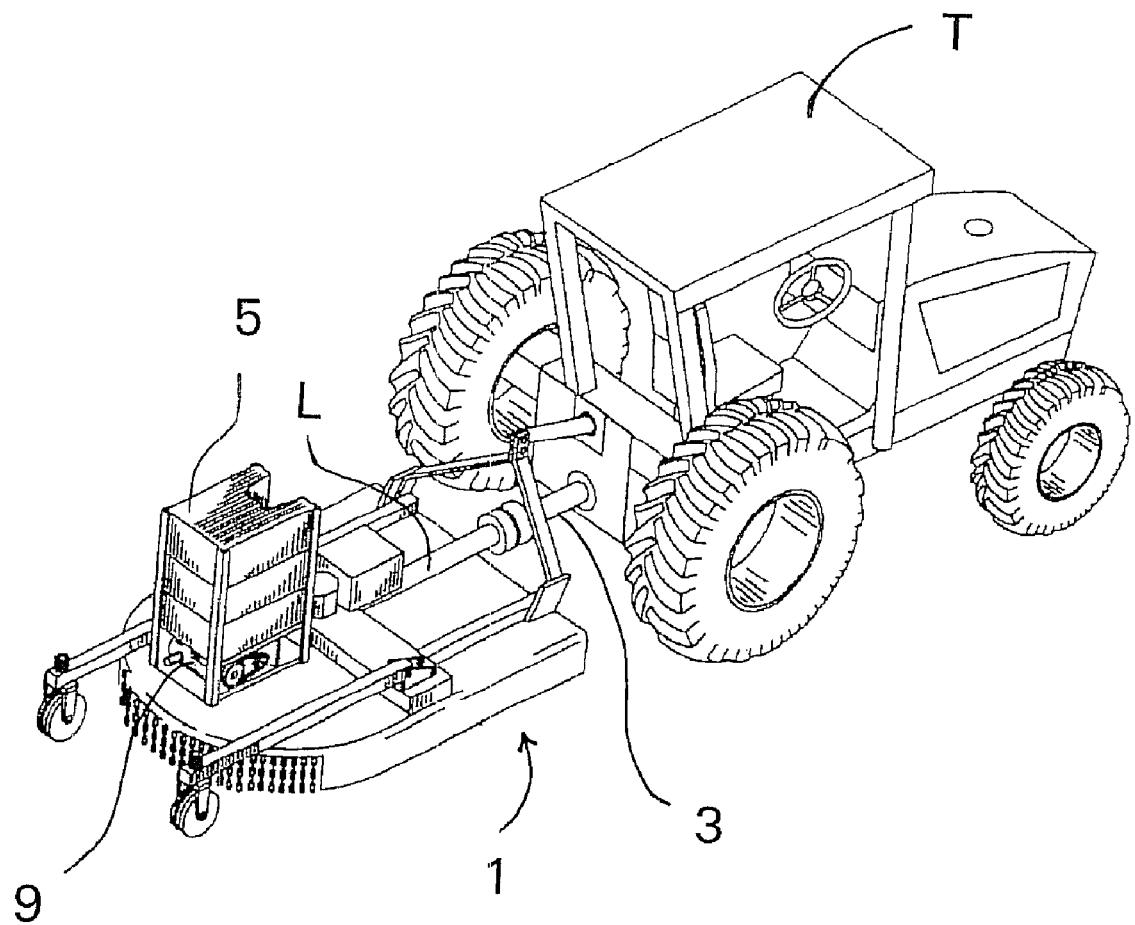
FIG. 1 is a perspective view of a mower including a series of herbicide fluid chambers containing the herbicide to be applied via the cutting blades of the mower.

FIG. 1, in general, shows a mower deck 1, as generally known in the art, being pulled by a tractor T and the mower deck 1 operatively connected to the tractor T by a power take-off (PTO) 3. Supported on a top surface of the mower deck 1 is a system of containers 5, or tanks, containing a treatment fluid (not shown) which is desirably delivered to the vegetation as it is cut by cutting blades 7 of the mower. Alternatively, the containers 5 could also be carried directly upon the tractor T, but for purposes of the following description, we assume they are supported on the mower deck 1 itself.

The treatment fluid is supplied from the containers 5, via a pump 9, at a controlled rate, when and where the operator desires. Generally, the pump 9 operates at a variable speed dependent on the ground speed of the tractor T, so that the requisite amount of treatment fluid is supplied from the containers 5 to produce a desired volume application to the cut vegetation. The treatment fluid may be any treatment fluid which is applied to the vegetation, such as a growth regulator, herbicide, pesticide, fungicide, fertilizer or biological agent, depending on the desired result. Preferably, the treatment fluid is water-borne. However, the treatment fluid may consist of any substance which combines with the treatment fluid to produce a non-viscous, flowable fluid. The treatment fluid is delivered to the underside of the cutting blade 7 so that the treatment fluid is applied to the cut vegetation substantially simultaneous with the cutting of the vegetation. In this way, the treatment fluid is applied directly to the immediately exposed translocation stream of the vegetation and is most effectively drawn to the root system of the vegetation.

Figure 2:
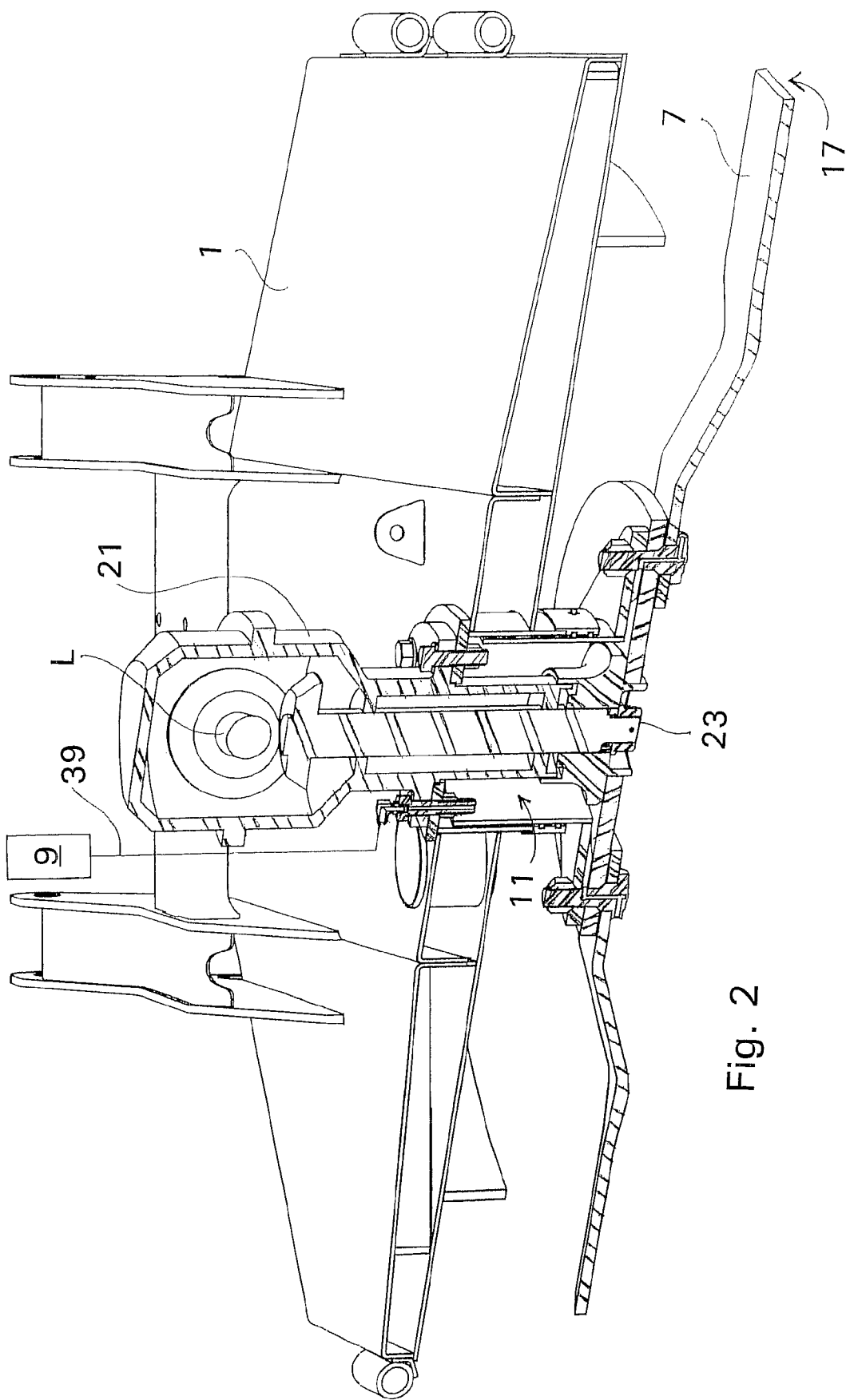
FIG. 2 is a perspective cross-section view of the mower deck, cutting and treatment fluid delivery apparatus.

The treatment fluid is supplied to the cut vegetation via a method and apparatus discussed in detail below. In particular, it is advantageous that the method and apparatus supply the treatment fluid through an intermediate reservoir 11 below the mower deck 1 to a bottom surface 17 of rotating cutting blades 7, as seen in FIG. 2, on the underside of mower deck 1. In this manner, the treatment fluid is effectively applied by the cutting blades 7 to the cut vegetation simultaneously with cutting the vegetation. It is to be understood that the method and apparatus may be used with any sort of mower including a push lawnmower, a power lawnmower or riding lawnmower, bush hog or bat-wing mower. In any event, the following method and apparatus may be utilized with almost any sort of cutting implement having a rotating cutting blade thereon.

As the mower deck 1 is pulled by the tractor T, the PTO drives the rotating cutting blade(s) 7 on the underside of the mower via a power transmission linkage L and a drive shaft 23 in a gearbox housing 21. At the same time, the pump 9 supplies the treatment fluid from the containers 5 on the upper surface of the mower deck 1 through a fluid conduit 39 to the intermediate reservoir 11 and onto the vegetation via the rotating blades 7. The below described apparatus discloses, in detail, the method and apparatus by which the treatment fluid is delivered from the containers 5 to the rotating cutting blade(s) 7.

Figure 3A:
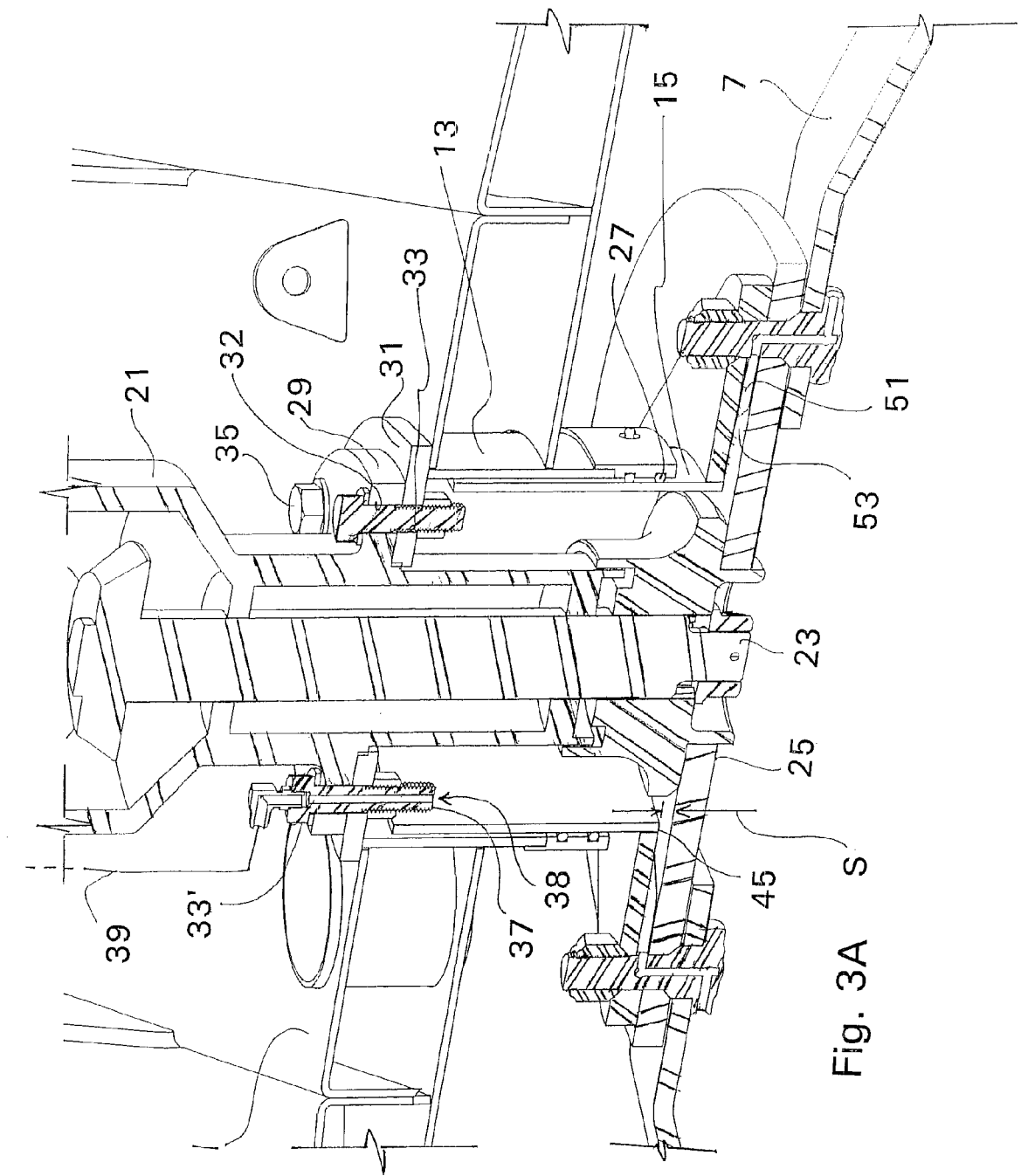
FIG. 3A is an exploded perspective cross-section view of the mower deck, cutting and treatment fluid delivery apparatus.
Figure 3B:
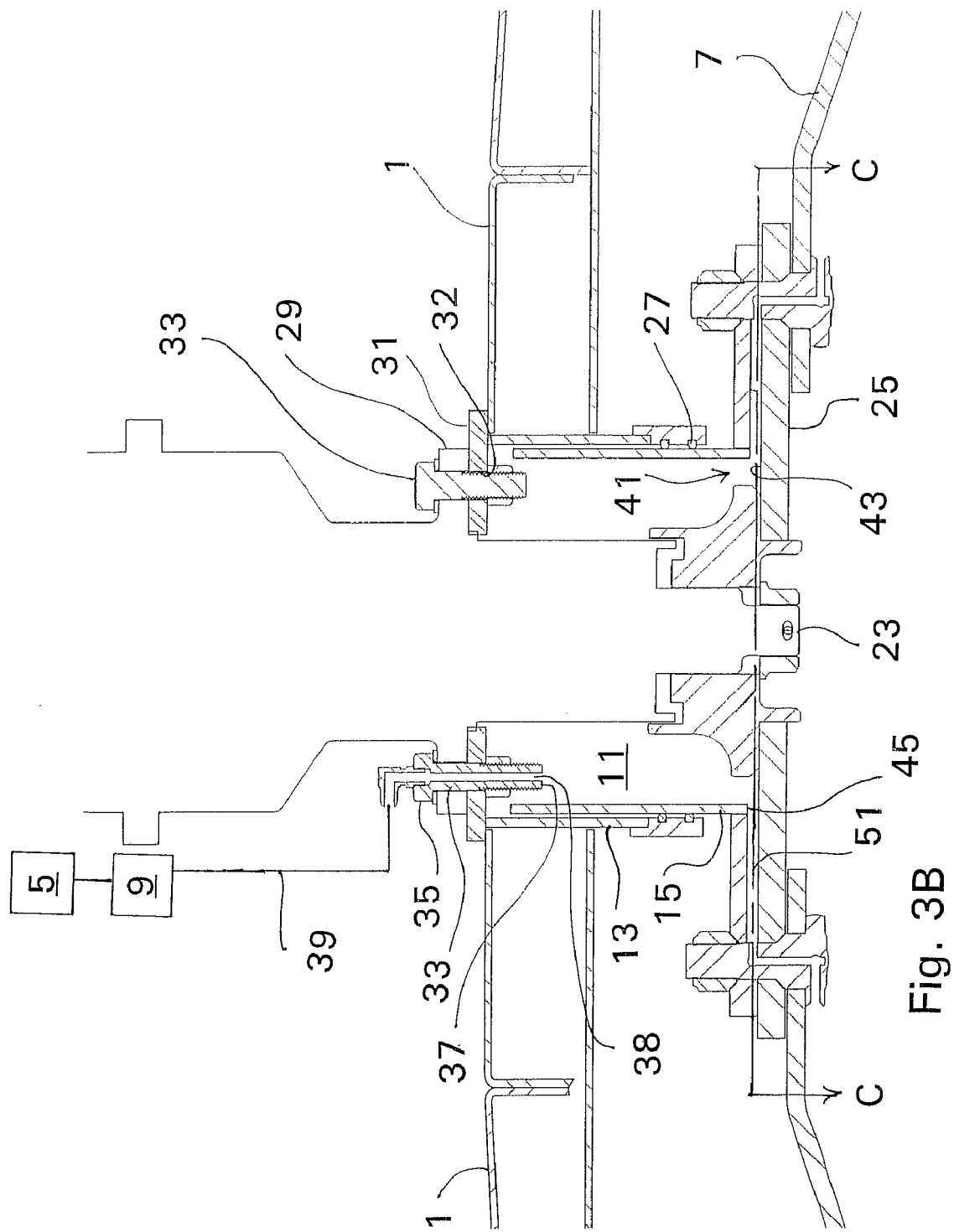
FIG. 3B is an exploded elevation cross-section view of the mower deck, cutting and treatment fluid delivery apparatus.

As shown in FIGS. 3A and 3B, the mower deck 1 supports the gearbox housing 21 which, in turn, encloses and supports the drive shaft 23 for the cutting blades 7. The drive shaft 23 depends downwards through the mower deck 1 and out of the bottom of the gearbox housing 21 to support a cutting blade mounting plate 25 to which the cutting blades 7 of the presently described apparatus are attached. The intermediate reservoir 11 is located between the underside of the mower deck 1 and the cutting blade mounting plate 25 and includes an upper sleeve 13 fixed to the mower deck 1 and axially overlapping a rotating lower sleeve 15 attached to the rotatable mounting plate 25. The lower sleeve 15 is provided with a smaller diameter than the upper sleeve 13 so that the lower sleeve 15 can fit partially inside the circumference of the upper sleeve 13 to a desired axially overlapping extent. It is to be appreciated that there is relative rotation between the fixed upper sleeve 13 and the rotating lower sleeve 15 when the PTO 3, linkage L and drive shaft 23 drives the mounting plate 25 and cutting blades 7. A radial seal 27, as shown in FIG. 3B, may also be provided between the relative overlapping inner and outer diameters of the upper and lower sleeves 13, 15 so that the treatment fluid contained in the intermediate reservoir 11 is neither contaminated by outside debris nor inadvertently leaked or spilled from the intermediate reservoir 11.

On top of the mower deck 1, the gearbox housing 21 is provided with a substantially horizontal housing flange 29 by which the housing is secured to the top surface of the mower deck 1. Between the housing flange 29 and the mower deck 1 is arranged a planar base plate 31 supporting the upper sleeve 13 of the intermediate reservoir 11 which depends downwards through the mower deck 1. A series of matching bolt holes 32 and corresponding gearbox housing bolts 33 are provided through the housing flange 29, base plate 31 and mower deck 1 to secure the gearbox housing 21 to the mower deck 1. The housing bolt holes 32 and respective gearbox housing bolts 33 are located radially within the circumferential diameter of the upper sleeve 13 of the intermediate reservoir 11.

Where a head 35 of the housing bolt 33 is generally exposed above the housing flange 29, a free end 37 of the bolt stem extends downwards through the holes 32 and directly into the intermediate reservoir 11. At least one of the gearbox housing bolts 33' securing the housing to the mower deck 1 is provided with an axial passage 38 therethrough. Passage 38 extends entirely axially through the gearbox housing bolt 33' from the head 35 through the free end 37. The fluid conduit 39, outside of the gearbox housing 21, extends from the container 5 with the treatment fluid to the axial passage 38 of the gearbox housing bolt 33 and, via the pump 9, the treatment fluid is delivered from the containers 5 through the fluid conduit 39 and axial passage 38 of the gearbox housing bolt 33 and into the intermediate reservoir 11.

It is to be appreciated from the above described structure that any treatment fluid delivered by the pump 9 through the fluid conduit 39 will similarly also pass through the axial passage 38 in the bolt and flow or drip into the intermediate reservoir 11 where the influence of the pump 9 on the supply of the treatment fluid to the cutting blades 7 is discontinued. The reservoir 11 can hold any desired volume of treatment fluid and, once the treatment fluid is delivered into the intermediate reservoir 11, the pressure from pump 9 no longer acts on the treatment fluid. Instead the treatment fluid, now contained within the confines of the lower sleeve 15, is effected solely by gravity and the centrifugal force generated by the rotation of the lower sleeve 15 with the mounting plate 25 and cutting blades 7. In otherwords, the method resulting from the described structure defines two independent steps: first, the treatment fluid is delivered to the reservoir 11 by the pump 9, second, once in the reservoir 11, the supply of treatment fluid to the bottom surface 17 of the cutting blades 7 is dependent on the rotation of the reservoir 11 and independent of the pump 9 so that the treatment fluid is not continuously pumped from the main tanks to the cutting blades 7.

The lower sleeve 15 is the main treatment fluid containing wall for the intermediate reservoir 11 and is non-rotatably attached to the mounting plate 25 and thus rotates with the drive shaft, mounting plate 25 and cutting blades 7. As the lower sleeve 15 of the intermediate reservoir 11 rotates, the treatment fluid therein is radially directed by centrifugal force outwards from the longitudinal axis of the drive shaft 23 and towards the inner wall of the lower sleeve 15. The lower sleeve 15 is attached to and supported on the mounting plate 25 in cooperation with a relief area 41 formed in the mounting plate 25. The relief area 41 defines a floor 43 of the intermediate reservoir 11 and the relief area 41 is approximately the same diameter as the lower sleeve 15 so that the lower sleeve 15 is partially axially fit into and attached therein. An axial space S is maintained between the floor 43 of the intermediate reservoir 11 and a lower-most edge 45 of the lower sleeve 15 so that at least one radial channel 51, described in detail below, formed in the mounting plate 25 can communicate with the intermediate reservoir 11.

Figure 3C:
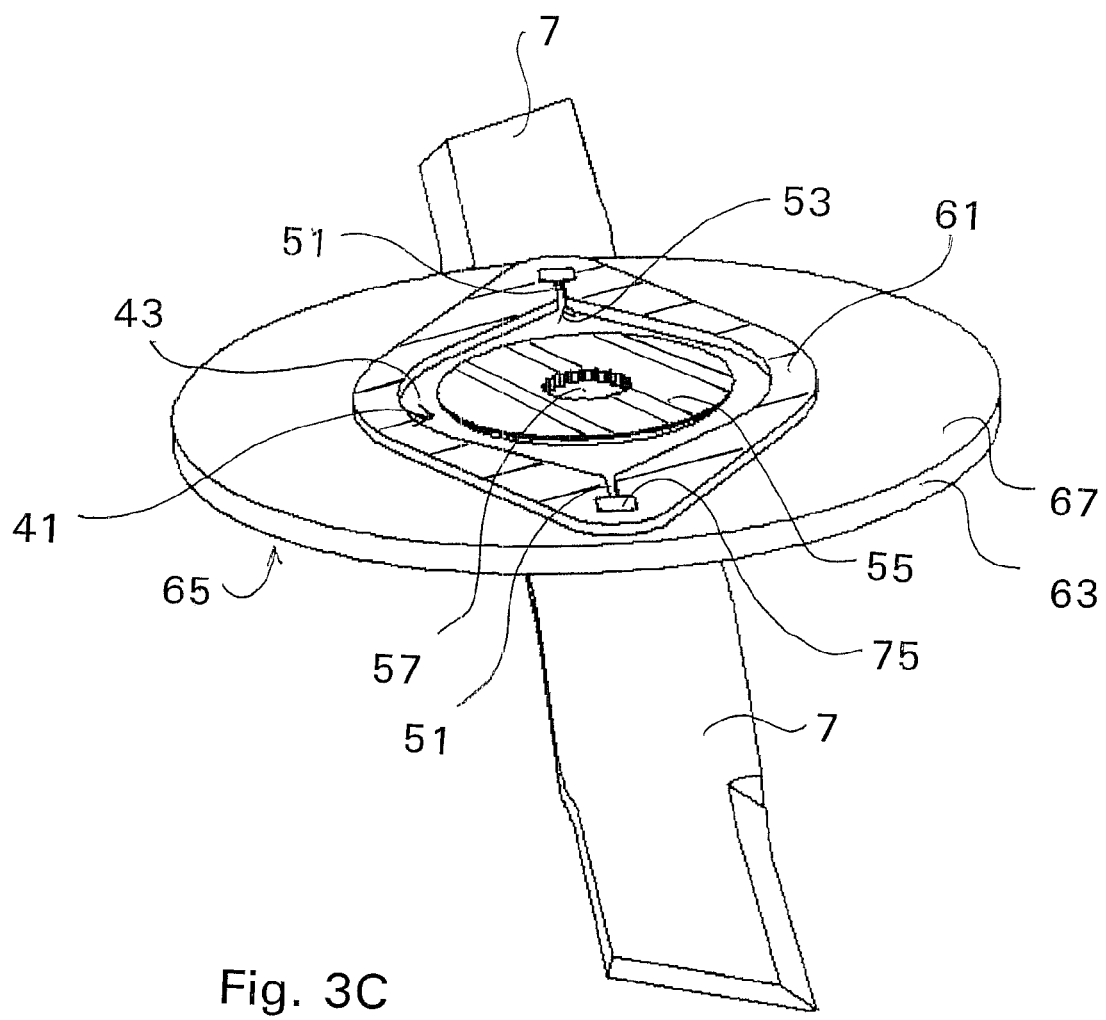
FIG. 3C is a perspective planar cross-section view of the mounting plate and blades of the present invention.

The relief area 41 defines the floor 43 of the intermediate reservoir 11 and, as noted above, the mounting plate 25 is provided with a series of radial channels 51 generally parallel and contiguously formed with the floor 43 and which communicate with the reservoir. As seen in FIG. 3C, along the cross-section C-C, the mounting plate 25 is thus formed with the radial channels 51 having a treatment fluid entrance 53 integrally formed with and adjacent the floor 43 of the intermediate reservoir 11 so that treatment fluid being radially directed outward by centrifugal force from the axis of the drive shaft 23 is propelled towards and into the radial channels 51. It is to be noted that a drive shaft mount 55 is also generally either formed integrally or separately mounted to define a center hole 57 in the mounting plate 25 for receiving a splined or toothed end of the drive shaft 23 and thereby non-rotatably securing the mounting plate 25 to the drive shaft 23.

In order to most effectively manufacture the mounting plate 25, the relief area 41 and radial channels 51, the mounting plate 25 is preferably formed of a separate upper plate 61 and a lower plate 63. The lower plate 63 is defined by a substantially planar bottom surface 65 to which the cutting blades 7 are effectively attached and a planar top surface 67 to which the upper plate 61 is attached and which forms the floor 43 of the intermediate reservoir 11. The upper plate 61 has an upper surface 69 and a lower surface 71 through which is formed an opening O having a diameter essentially the same as the lower sleeve 15. The radial channels 51 are formed as a relief in the planar lower surface 71 of the upper plate 61 and extend radially outwards from the mounting plate 25 opening to the bolt hole passage(s) 75 formed through the upper plate 61. Alternatively, it is also conceivable that such relief area 41 could be formed in the lower plate 63.

The radial channels 51 do not have to be entirely constant diameter passages. The radial channels 51 may include the funnel-shaped fluid entrance 53 having a larger cross-sectional area which then necks down to a smaller cross-sectional area as the radial channels 51 proceed radially outwards towards the bolt hole passages 75. Such a structure provides that a larger volume of treatment fluid is captively retained by centrifugal force in the funnel-shaped fluid entrance 53 as the mounting plate 25 rotates. This retained treatment fluid ensures that a relatively constant supply of treatment fluid is forced into the radial channels 51 and hence towards the cutting blades 7 no matter what volume of treatment fluid is contained in the intermediate reservoir 11.

Figure 4:
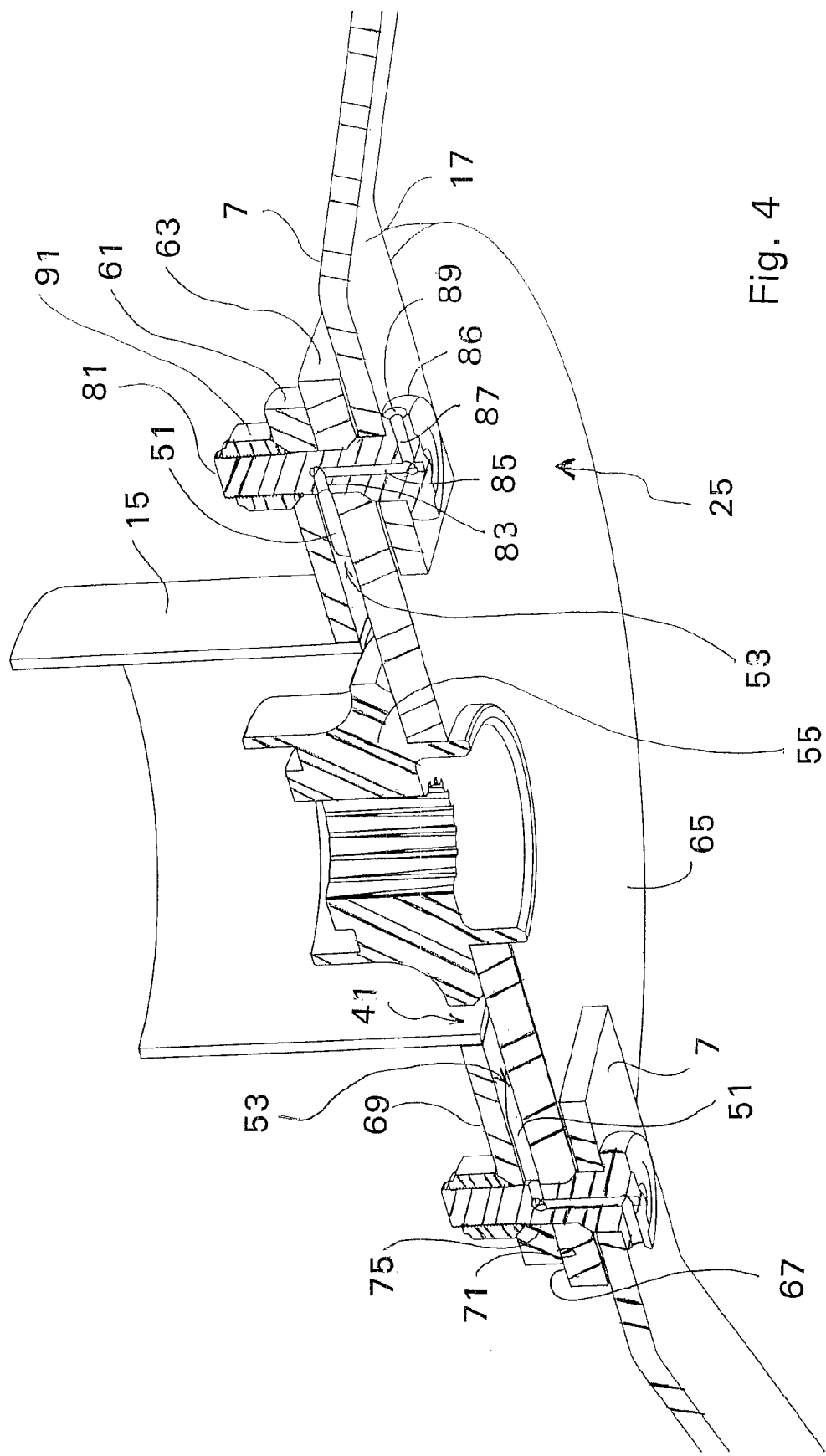
FIG. 4 is a bottom perspective cross-section view of the mounting plate and fluid treatment reservoir.

To form the complete mounting plate 25, as in FIG. 4, the upper plate 61 and the lower plate 63 are secured together whereby the lower surface 71 of the upper plate 61 is mated with the planar top surface 67 of the lower plate 63 and with the bolt hole passages 75 aligned. The radial channels 51 thus extend from the mounting plate opening O along the mating surfaces 71, 67 of the upper and lower plates 61, 63 and hence to the bolt hole passages 75. At the bolt hole passages 75, the radial channels 51 will communicate with the blade bolt passages formed in the mounting blade bolts 81 connecting the cutting blades 7 to the blade mounting plate 25 and described in further detail below.

Figure 5:
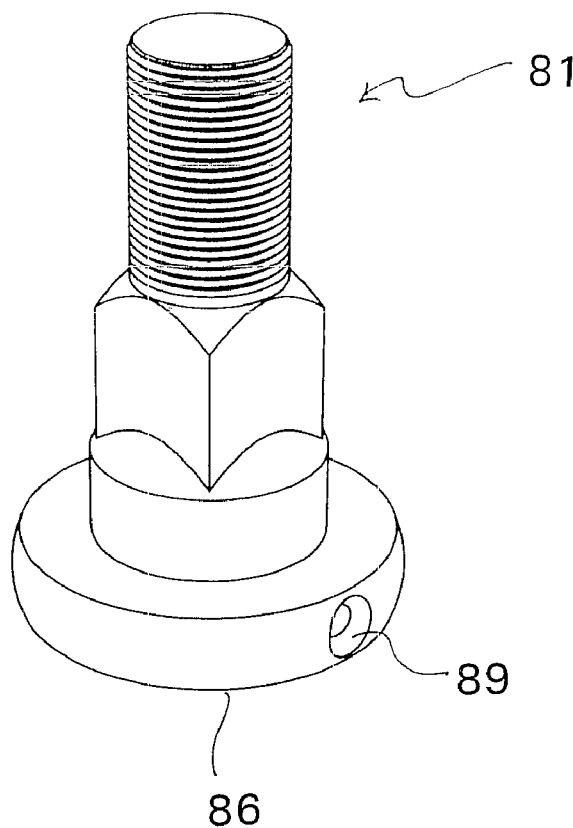
FIG. 5 is a perspective view of a blade bolt and treatment fluid exit orifice.
Figure 6:
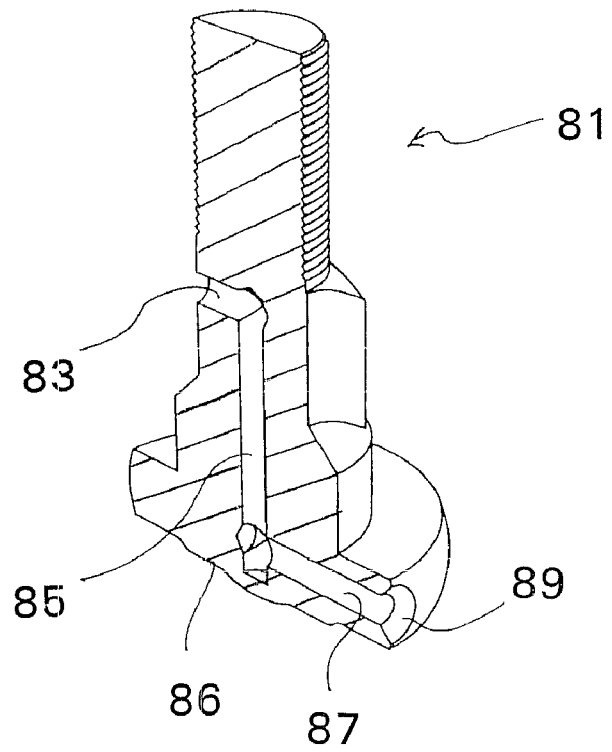
FIG. 6 is a perspective cross-section view of the blade bolt and treatment fluid passageways.

In order to reduce the parts and simplify the maintenance and manufacture of this apparatus, as seen in FIG. 4, the mounting blade bolts 81 secure the requisite cutting blades 7 directly to the bottom surface 17 of the lower plate 63. As seen in FIGS. 4-6, the mounting blade bolt 81 has the bolt channel defined by a radial fluid entrance passage 83 communicating with the intermediate radial channel 51 in the mounting plate 25. An axial passage 85 connects with the radial fluid entrance passage 83 so that the centrifugally influenced treatment fluid is passed along an axial length of the bolt and then out a radial exit passage 87 formed in a head 86 of the bolt. The radial exit passage 87 in the head 86 of the bolt 81 terminates in an exit orifice 89 immediately adjacent a bottom surface 17 of the cutting blade 7.

As can be appreciated, where a desired volume of treatment fluid is maintained in the intermediate reservoir 11, the centrifugal force of the cutting blade mounting plate 25 directs the treatment fluid from the reservoir through the radial channel(s) 51 in the mounting plate 25, into the entrance channel in the blade mounting bolt(s) and subsequently out the radial exit passage 87 and exit orifice 89 in the head 86 of the bolt and onto the bottom surface 17 of the cutting blades 7 for application to cut vegetation. Also, the passages 83, 85 and 87 do not have to be drilled or formed entirely within the interior of the bolt 81, the passages may also be formed, in whole or in part, as partially open channels along the outer surface of the bolt 81.

A notch 91 is provided on the upper surface 69 of the upper plate 61 and engages with the threaded stem of the blade mounting bolt 81 to secure the bolt 81 to the mounting plate 25 and hence the cutting blade 7 also to the mounting plate 25. The cutting blade 7 is secured by the bolt 81 in a relatively loose manner so that the blade 7 can spin freely about the bolt 81 and even move axially up and down slightly along the longitudinal axis of the bolt 81. In otherwords, the blade 7 is not tightly secured to the bottom surface of the mounting plate 25, but may rotate and shift slightly up and down relative thereto defining a variable gap between the bottom surface of the mounting plate 25 and the top surface of the blade 7. The upper and lower plates 61, 63 of the mounting plate 25 are generally welded together so that the main purpose of the mounting bolt 81 is to removably attach the cutting blades 7 to the mounting plate 25. It is also to be appreciated that the mounting plate 25 itself could be made of a single piece of material having the radial channels 51 formed therein and communicating with the axially aligned mounting bolt hole passages 75.

Figure 7B:
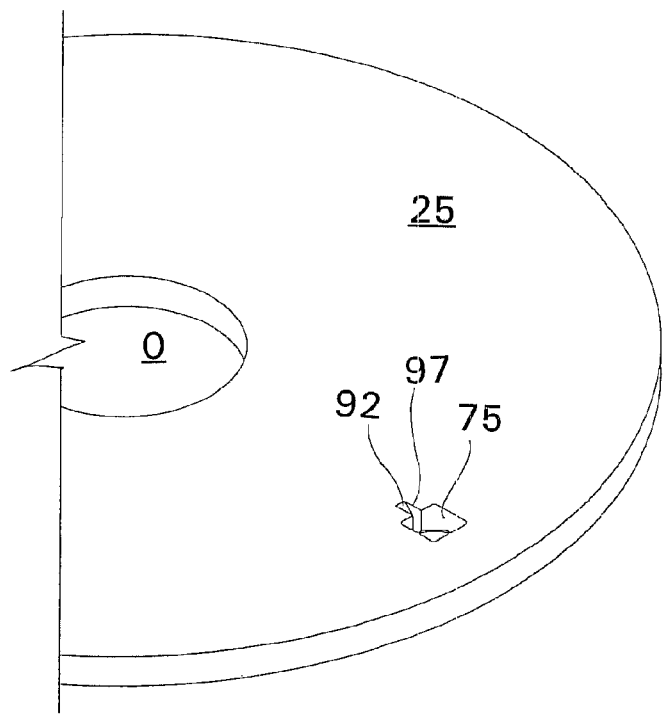
FIG. 7B is an elevational cross-sectional view of the second embodiment of the mounting plate and cutting blade.
Figure 7A:
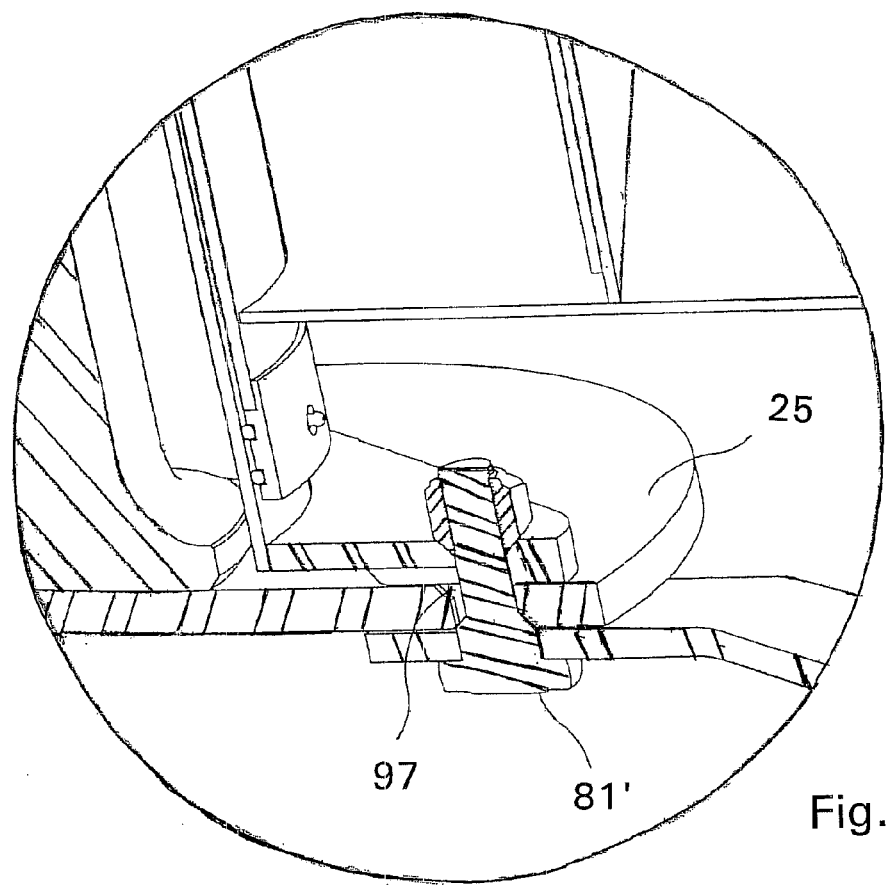
FIG. 7A is a perspective cross-sectional view of a second embodiment of the mounting plate and cutting blade having a notch in the mounting plate.

In another embodiment of the present invention, shown in FIGS. 7A-7B, the blade bolt 81' is not provided with the internal passages, but is a single, solid bolt. In order to permit the centrifugally directed treatment fluid to migrate to the blade 7, a notch 97 is formed adjacent and integral with the square bolt hole passage 75 through the mounting plate 25. The notch 97 creates a through passage immediately adjacent the blade bolt 81 and completely through the mounting plate 25 permitting the treatment fluid to pass through the mounting plate 25 adjacent the blade bolt 81 and directly to the top surface of the cutting blade 7 and the bottom surface of the mounting plate 25. The notch 97 may be provided with an upper inclined surface 92 angled or leading downwards to a vertical sidewall 93. The inclined or sloped surface 92 of the notch 97 permits both centrifugal force and gravitational forces to mutually act on the treatment fluid directed outward by the rotation of the mounting plate 25 thereby facilitating the passage of the treatment fluid through the mounting plate 25. From the notch outlet, the treatment fluid will migrate, again by centrifugal force, across the top surface of the cutting blade 7 and also eventually onto the bottom surface 17 of the cutting blade 7, as well as the actual cutting edge and surfaces of the cutting blade 7 whereby the treatment fluid is applied to the cut vegetation.

Figure 8B:
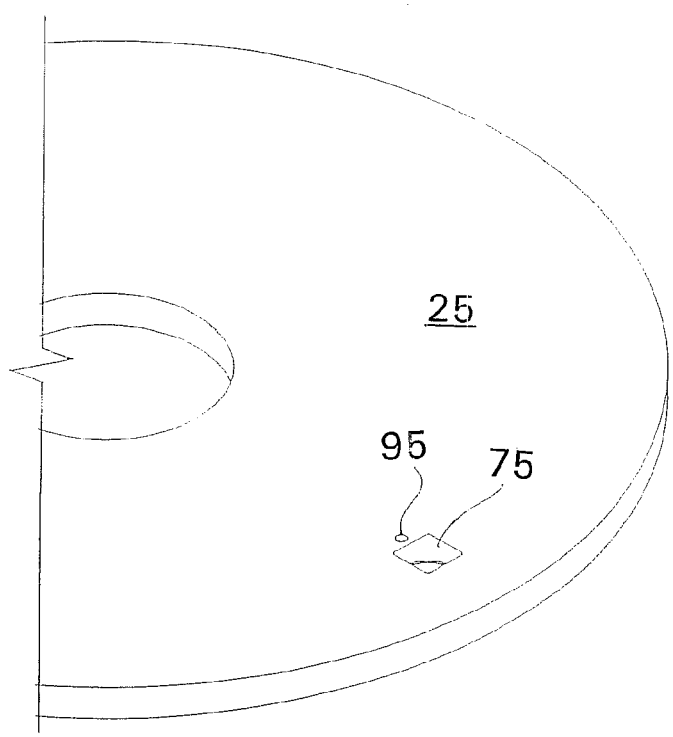
FIG. 8B is an elevational cross-sectional view of the third embodiment of the mounting plate and cutting blade.
Figure 8A:
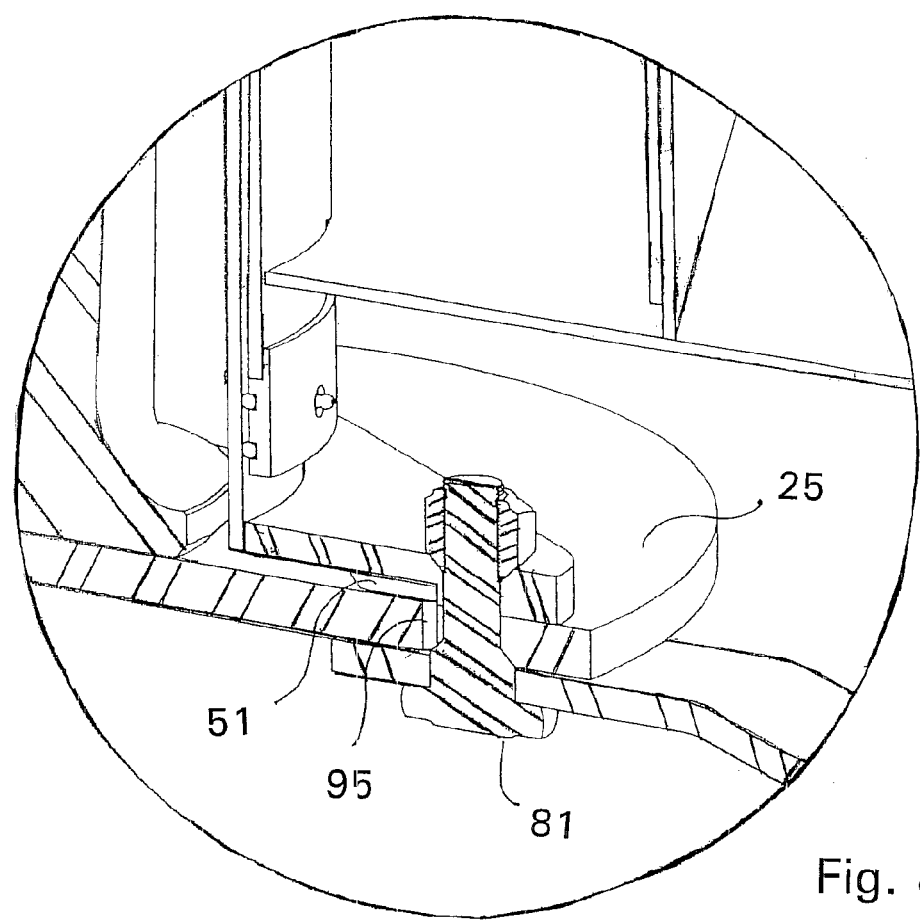
FIG. 8A is a perspective cross-sectional view of a third embodiment of the mounting plate and cutting blade having a sprue hole formed in the mounting plate.

Alternatively, a sprue hole 95, as shown in FIGS. 8A-8B, may be integral with or slightly spaced from the square bolt hole passages 75 and also extend entirely through the mounting plate 25. The sprue hole 95 extends completely from communication with the radial channels 51, extending from the reservoir 11, to the bottom of the mounting plate 25 and thus similar to the previously discussed notch 91 permits the seepage or passage of the treatment fluid through the mounting plate and onto the top surface of the cutting blade 7. As seen in FIG. 8B, the sprue hole 95 may intersect with a sloped, countersunk surface of the square bolt 81 so that the treatment fluid can come into contact with, easily pass around and centrifugally outwards beyond the blade bolt 81. The point in either structure, the notch 97 or the hole 95 is that the treatment fluid is delivered through the mounting plate 25 and immediately onto the top surface of the cutting blade 7 adjacent the blade bolt 81 so that treatment fluid can accumulate to some extent thereon and be forced to migrate radially outwards along the top, bottom and cutting surfaces of the cutting blades 7 which contact the cut vegetation.

It is also to be appreciated that the square bolt hole passage 75 may also or alternatively be sized slightly larger relative to the matching blade bolt 81 so as to allow the treatment fluid to be drawn downwards between the bolt hole passage 75 and the blade bolt 81. In this case, neither the sprue hole 95 or the notch 91 is necessary and a sufficient amount of treatment fluid will still flow to the cutting blade 7. Also, because the cutting blade 7 is not rigidly fixed to the mounting plate or the blade bolt 81 and is essentially permitted to spin freely relative thereto, there is enough of a gap between the bolt hole through the cutting blade 7 and the blade bolt 81 to also permit the downward migration of treatment fluid from the top surface of the cutting blade 7 to the bottom surface 17 of the cutting blade 7 where the treatment fluid can also migrate radially due to centrifugal force out onto the bottom surface 17 of the cutting blade 7.

In a still further aspect of the present invention, a similar notch or passage, as described above, may be provided in the cutting blade 7 which would enable fluid delivered from the notch or the through hole to pass down through the cutting blade 7 and directly to the bottom surface 17 of the cutting blade 7. Since certain changes may be made in the above described liquid herbicide applicator without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. An apparatus for cutting vegetation and treating the cut stems with a desired treatment fluid, the apparatus comprising:

a blade mount non-rotatably connected to a drive shaft;

at least one cutting blade connected to the blade mount by a securing bolt radially spaced from the drive shaft;

a fluid reservoir formed concentrically about the drive shaft and supported on the blade mount;

a radially extending channel formed in the blade mount and communicating from the fluid reservoir through the blade mount to an exit orifice immediately adjacent a surface of the cutting blade; and the securing bolt of the at least one cutting blade defining at least a portion of a fluid passage between the radially extending channel and the exit orifice adjacent the surface of the cutting blade.

2. The apparatus for cutting vegetation and treating the cut stems with a desired treatment fluid as set forth in claim 1 further comprising a pump for supplying the desired treatment fluid from a main fluid supply to the fluid reservoir where the treatment fluid flows by centrifugal force from the fluid reservoir through the radially extending channel and out the exit orifice onto the surface of the cutting blade.

3. The apparatus for cutting vegetation and treating the cut stems with a desired treatment fluid as set forth in claim 1 and wherein besides an entrance passage and the exit orifice the fluid reservoir is substantially enclosed to maintain a desired volume of treatment fluid therein from contact with the environment.

4. The apparatus for cutting vegetation and treating the cut stems with a desired treatment fluid as set forth in claim 1 and wherein the blade mount comprises at least an upper part and a lower part with the channel formed therebetween to direct the fluid toward the passage defined by the bolt.

5. The apparatus for cutting vegetation and treating the cut stems with a desired treatment fluid as set forth in claim 1 and wherein the fluid reservoir is sealed by a circumferential seal between the reservoir and a reservoir housing.

6. The apparatus for cutting vegetation and treating the cut stems with a desired treatment fluid as set forth in claim 4 and wherein material is removed from at least one of the upper part or lower part of the blade mount which are then secured together to define the channel directing the fluid toward the passage in the bolt.

7. The apparatus for cutting vegetation and treating the cut stems with a desired treatment fluid as set forth in claim 1 and wherein the bolt is provided with a bolt head having a larger diameter than a remainder of the bolt and which secures the cutting blade to the blade mount and a portion of the passage extends radially through the bolt head to the exit opening formed in a circumferential edge of the bolt head immediately adjacent the bottom surface of the cutting blade.

8. The apparatus for cutting vegetation and treating the cut stems with a desired treatment fluid as set forth in claim 1 and wherein the cutting blade is secured directly to the blade mount solely by the bolt.

9. An apparatus for cutting vegetation with a cutting implement and treating the cut vegetation with a desired treatment fluid, the apparatus comprising:

a blade mount non-rotatably connected to a drive shaft, the blade mount comprising;

a top portion and a bottom portion having a common axis of rotation and defining a channel therebetween;

a bolt radially spaced from the drive shaft for securing the cutting implement to the blade mount;

a passage formed in the bolt communicating with the channel defined between the top and bottom portions of the blade mount; and a reservoir formed concentric about the drive shaft and the common axis of rotation and communicating with the channel defined between the top and bottom portions of the blade mount.

10. The apparatus for cutting vegetation and treating the cut stems with a desired treatment fluid as set forth in claim 9 and wherein the cutting blade is rotatably secured by the bolt directly to the bottom portion of the blade mount.

11. The apparatus for cutting vegetation and treating the cut stems with a desired treatment fluid as set forth in claim 9 and wherein the channel is formed circumferentially about the common axis of rotation and includes opposing tapering fluid paths extending radially to connect with the passage in the bolt.

12. The apparatus for cutting vegetation and treating the cut stems with a desired treatment fluid as set forth in claim 11 and wherein fluid in the reservoir is directed solely by centrifugal force through the channel and tapering fluid path into the bolt passage.

13. A method of delivering a desired treating fluid to a surface of a cutting blade, the method comprising the steps of:

securing a blade mount non-rotatably connected to a drive shaft;

connecting at least one rotary driven cutting blade connected to the blade mount by a securing bolt radially spaced from the drive shaft;

supplying the desired treating fluid to a fluid reservoir formed concentrically around the drive shaft and supported on the blade mount;

inducing the treating fluid to flow from the fluid reservoir by centrifugal force into a channel formed in the blade mount;

defining at least a portion of a fluid passage through the securing bolt providing a channel formed between the blade mount and an exit opening adjacent the surface of the cutting blade; and ejecting the treating fluid from the exit opening directly onto a surface of the cutting blade.

* * * * *